/ 06 · 96

United States Patent Office 2,839,811
Patented June 24, 1958

---

2,839,811

COMPOSITION AND METHOD FOR CURING CONCRETE, SAID COMPOSITION CONTAINING CYCLIZED RUBBER AND WAXES

Stephen W. Benedict, Cleveland Heights, and Paul T. Camp, Euclid, Ohio, assignors, by mesne assignments, to American-Marietta Company, Chicago, Ill., a corporation of Illinois No Drawing. Application July 22, 1955
Serial No. 523,943

6 Claims. (Cl. 25—154)

This invention relates to a process for and coating compositions particularly suited for use in curing concrete, mortar and artificial stone. It has particular reference to a process for and coating compositions particularly suited for use in curing concrete floors, walks, piers, roadways, etc. containing Portland or other hydraulic cements.

It is well known that for cementitious materials to attain maximum strength, it is necessary that water be present in the concrete or mortar for a period of time sufficient to hydrate the silicates and aluminates in the cement. It has been the practice to cure the concrete by ponding water on the surface or to cover it with paper, straw, wet sand or earth, asphalt emulsion or the like in order to maintain the moisture level as high as possible for better curing. More recently special resin base, concrete curing compounds have appeared. These tend, however, to be hard and brittle and are subject to spalling and chipping. Other forms are wax emulsions which have not been satisfactory because of a discontinuous film structure. They also streak badly.

Another system has been a two coat system of a curing compound and a separate wax coating applied thereover. The present system is a single coating providing not only improved cure conditions but also a hard, durable, and attractive final surface.

It is an object of this invention to provide an improved concrete curing compound having improved properties of adhesion to the substrata, film continuity and ability to take a polish, as well as serving the desired purpose of effectively retarding the rate of water evaporation.

Other objects will appear as the description proceeds.

The compositions which we have found most suitable in the achievement of these objects are gel dispersions comprising a nonaqueous partially solvated oxidized microcrystalline wax having a melting point above about 190° F. having dispersed therein a cyclized natural rubber and an unsaponifiable crystalline wax-like substance having a melting point below about 165° F. It has been found convenient for certain applications, e. g., factories, recreation rooms etc. to incorporate a pigment into the composition to impart a color to the concrete surface.

The consistency of these compositions varies from rather stiff pastes to thin dispersions depending upon the amount of solvent employed. Application to the surface of the fresh concrete may be by any of the well recognized methods, e. g., spray, flooding, roller, brush, etc.

A principal ingredient of these compositions is the oxidized microcrystalline or amorphous wax. These oxidized waxes are high melting point derivatives from refined petroleum which have been oxidized, as by blowing with a free oxygen-containing gas. Melting points are above about 195° F. for the most part and frequently between about 210–220° F. The viscosity of such waxes at 300° F. is from about 200 cps. to about 600 cps. For purposes of formulating, the powder form is generally used.

In formulating the "partial solvates" as they will be termed herein, the oxidized microcrystalline wax is added to an aliphatic petroleum distillate which has been heated to slightly below the boiling point for the lighter distillates and to about 140° F. to 180° F. for the higher boiling solvents. At elevated temperatures, clear solutions are usually obtained. As the temperature falls to normal, however, a gel or paste is obtained in which the microcrystalline wax is believed to be partially dissolved or solvated by the solvent. The solvating medium is an aliphatic petroleum fraction boiling from about 140° F. to 425° F. While it is most convenient and economical to use petroleum distillates, such as mineral spirits, V. M. & P. naptha, petroleum ether, kerosene, Solvesso, Stoddard solvent, and other such commonly available materials, it will be understood that these may be substituted for in whole or in part by pure or commercial grades or mixtures of such aliphatic hydrocarbons as hexane, 2,3-dimethyl butane, 2-methyl pentane, 3-methyl pentane, heptane, 2,2-dimethyl pentane, 2-methyl hexane, 3-methyl hexane, octane, 2-methyl heptane, 2-ethyl hexane, the nonanes, the decanes, and the cycloaliphatic hydrocarbons, e. g., cyclopentane, methyl cyclopentane, cyclohexane, methyl cyclohexane, 1,1-dimethyl cyclopentane, etc.

An essential component of these compositions is a cyclized rubber, either milled or unmilled. These materials are produced from unvulcanized low protein natural rubber with a halide of an amphoteric metal, e. g., stannic chloride, ferric chloride, or chlorostannic acid. Reference may be had to U. S. Patent No. 2,052,423 for the method of preparing suitable compounds. The unmilled product is a fine white powder while the milled material is in the form of light amber, thermoplastic granules. The product of the cyclization reaction described in the aforesaid patent is a mixture of hydrocarbons having less saturation than the parent substance. Cyclized rubber is readily soluble in aliphatic solvents and dries to a hard, flexible, glossy film of excellent clarity.

In certain embodiments of this invention, pigments are employed. Preferably these pigments are of the usual types, such as rutile titanium dioxide, carbon black, zinc oxide, red lead, red iron oxides, zinc chromate, diatomaceous earth, kaolin, chromium oxides, yellow iron oxide, C. P. chrome greens and chrome yellows, ultramarine blue, copper phthalocyanine blues, etc. The pigment may be dispersed in the cyclized rubber in any suitable manner, such, for example, as by milling the ingredients on a rubber mill, intergrinding them etc. or the pigment may be mixed in the composition when in liquid form by agitation or by a high-speed, high-shear, stirring mechanism or other known methods. When a pigment-cyclized rubber dispersion is made, it may contain from 20% to 80% of the pigment with the balance, cyclized rubber. In the specific examples which follow, where pigments have been used, the predispersed pigment-cyclized rubber compound has been used.

In addition to the oxidized microcrystalline or amorphous wax above described, these compositions also contain a crystalline unsaponifiable wax-like material such as paraffin wax or slack wax. These waxes have melting points between about 110° F. and 165° F. and are derived from petroleum in the refining thereof.

The following specific examples will illustrate compositions useful in accordance herewith, it being understood that such examples are for illustrative purposes only and are in no way limitative of the number of different examples which may be formulated within the teachings hereof. In these examples, the parts are by weight.

*Example 1*

Thirty-three pounds, two ounces of Stoddard solvent (flash point 110° F.) boiling from about 325° F. to not over 410° F. were placed in a heated mixer provided with an agitator. Heating is begun and the cyclized rubber-pigment ingredient is added. In this particular case the cyclized rubber pigment component was a milled mixture of 40 parts natural rubber "pliolite" and 60 parts red iron oxide. 6.5 lbs. of this material were added and the temperature of the mixture allowed to reach 160° F. to 180° F. while mixing was continued until an even dispersion was obtained.

5.2 lbs. of oxidized microcrystalline wax and 5.2 lbs. of paraffin wax (M. P. 140° F.) were added and the mixing continued until a substantially uniform dispersion is obtained. Alternatively, the waxes may be pre-melted and added to the solvent cyclized rubber mass.

Heating is discontinued, but agitation continued until the temperature has dropped to from about 180° F. to about 140° F. At this temperature, agitation is stopped and the product immediately packaged. It has been found that stirring the batch below about 140° F. (the M. P. of the paraffin wax) may interfere with the gelling properties of the composition and may cause separation in the finished product. If this does occur, the batch can be re-worked by reheating to about 180° F. and following proper procedure. The product is a red, cement curing compound.

*Example 2*

Following the same procedure given in Example 1, the following ingredients were admixed to provide a grey cement curing compound:

| | Parts |
|---|---|
| Stoddard solvent (325–410° F.) | 33 |
| "Pliolite" (cyclized rubber) | 4 |
| Carbon black | 0.2 |
| Titanium dioxide (rutile) | 2 |
| Oxidized microcrystalline wax (M. P. 220° F.) | 5 |
| Paraffin wax (M. P. 140° F.) | 5 |

*Example 3*

Following the same procedure given in Example 1 above, a black cement curing composition formulated as follows was produced.

| | Parts |
|---|---|
| Mineral spirits (302°–394° F.) | 35 |
| "Pliolite" | 3 |
| Carbon black | 1 |
| Oxidized microcrystalline wax | 6 |
| Paraffin wax (M. P. 140° F.) | 6 |

*Example 4*

A green composition may be prepared by the procedure of Example 1 in accordance with the following formulation:

| | Parts |
|---|---|
| V. M. and P. naphtha (240–325° F.) | 508 |
| "Pliolite" | 40 |
| Chrome oxide green | 92 |
| Oxidized microcrystalline wax (M. P. 220° F.) | 80 |
| Paraffin wax (M. P. 140° F.) | 80 |

*Example 5*

A clear composition may be prepared by the procedure of Example 1 in accordance with the following formulation:

| | Parts |
|---|---|
| n-Heptane (208° F.) | 500 |
| "Pliolite" | 39 |
| Oxidized microcrystalline wax (M. P. 220° F.) | 78 |
| Paraffin wax (M. P. 140° F.) | 78 |

*Example 6*

A brown colored composition may be prepared by the procedure of Example 1 in accordance with the following formula:

| | Parts |
|---|---|
| Stoddard solvent (325–410° F.) | 530 |
| "Pliolite" | 42 |
| Brown iron oxide | 62 |
| Oxidized microcrystalline wax (M. P. 220° F.) | 83 |
| Paraffin wax (M. P. 140° F.) | 83 |

Compositions suitable for use on wet concrete surfaces usually contain from about 20% to 60% total solids. Additional solvent may be added to adjust the consistency to that desired for application, e. g., spray, roller, flooding, etc. The cyclized rubber component is usually present in amounts ranging from about 4% to about 15% by weight. The waxes comprise about 18% to 30% of the composition as a general rule and are conveniently present in about equal parts although this ratio may be varied from about 2:1 to 1:2 if desired. Pigments are optional and the amount is not critical. Generally, up to 10% by weight of the pigment may be used.

The compositions of this invention are applied in the usual manner to wet cementitious surfaces, e. g., a freshly placed concrete floor, and are advantageous in that they be applied at a time when the surface is wetter than permissible when other curing systems are used. The compositions also readily cure to form a continuous film having relatively low water vapor transmission, and, when cured, the film provides a durable, substantially non-tracking surface with anti-slip properties. The gel structure of the improved product provides sufficient solvent retention to permit polishing of the film without streaking, and the polished film may be readily cleaned.

Thus, it is possible to obtain, in a single operation, cure control and a durable, attractive finish for the concrete.

Other modes of applying the principle of this invention may be employed instead of those specifically set forth above, changes being made as regards the details herein disclosed, provided the elements set forth in any of the following claims, or the equivalent of such be employed.

Having described our invention, we claim:

1. A coating composition comprising from about 18 to about 30 parts by weight of a combination of waxes comprising oxidized microcrystalline wax having a melting point above about 190° F. and unsaponifiable crystalline wax having a melting point below about 165° F., said waxes being present in a weight ratio from about 2:1 to 1:2, and from about 4 to about 15 parts by weight of a cyclized natural rubber, said waxes and cyclized rubber being dispersed in sufficient hydrocarbon solvent to partially solvate the microcrystalline wax and produce a mobile mixture containing up to about 60% solids and capable of being thinned with additional hydrocarbon solvent to a desired consistency for application to a surface to be coated.

2. A composition in accordance with claim 1 in which the unsaponifiable crystalline wax is paraffin wax having a melting point of from about 110° F. to about 165° F.

3. A composition in accordance with claim 1 in which the cyclized natural rubber has dispersed therein at least one pigmentary material.

4. A composition in accordance with claim 1 in which the unsaponifiable crystalline wax has a melting point from about 110° F. to about 165° F., the hydrocarbon solvent is an aliphatic solvent and the mixture contains from about 20% to about 60% solids.

5. In a process for curing concrete wherein the concrete is placed and allowed to harden, the step which comprises applying to the surface of the freshly placed wet concrete a non-aqueous coating composition comprising from about 18 to about 30 parts by weight of a combination of waxes comprising oxidized microcrystalline wax having a melting point above about 190° F. and unsaponifiable crystalline wax having a melting point below about 165° F., said waxes being present in a weight ratio from about 2:1 to 1:2, and from about 4 to about 15 parts by weight of a cyclized natural rubber, said waxes and cyclized rubber being dispersed in sufficient hydrocarbon solvent to partially solvate the microcrystalline wax and produce a mobile mixture containing up to about 60% solids and capable of being spread as a thin coating film.

6. A process for curing concrete in accordance with claim 5 in which the unsaponifiable crystalline wax has a melting point from about 110° F. to about 165° F., the hydrocarbon solvent is an aliphatic solvent and the mixture contains from about 20% to about 60% solids.

References Cited in the file of this patent

UNITED STATES PATENTS

| | | |
|---|---|---|
| 2,275,272 | Scripture | Mar. 3, 1942 |
| 2,299,951 | Ingle | Oct. 27, 1942 |
| 2,388,984 | Mack | Nov. 13, 1945 |

OTHER REFERENCES

Warth: "The Chemistry and Technology of Waxes," Reinhold Publishing Corp., New York (1947), pages 249, 252, 255–6.